(12) United States Patent
Wang

(10) Patent No.: US 9,118,540 B2
(45) Date of Patent: *Aug. 25, 2015

(54) METHOD FOR MONITORING A PLURALITY OF RACK SYSTEMS

(75) Inventor: Hao-Hao Wang, Shanghai (CN)

(73) Assignee: INVENTEC CORPORATION, Taipei (TW)

( * ) Notice: Subject to any disclaimer, the term of this patent is extended or adjusted under 35 U.S.C. 154(b) by 147 days.

This patent is subject to a terminal disclaimer.

(21) Appl. No.: 13/399,692

(22) Filed: Feb. 17, 2012

(65) Prior Publication Data
US 2013/0138805 A1    May 30, 2013

(30) Foreign Application Priority Data
Nov. 28, 2011    (CN) .......................... 2011 1 0386021

(51) Int. Cl.
*G06F 15/173* (2006.01)
*H04L 12/24* (2006.01)

(52) U.S. Cl.
CPC ............ *H04L 41/04* (2013.01); *H04L 41/0695* (2013.01)

(58) Field of Classification Search
CPC .................................................... G06F 15/173
USPC ................................................ 709/224, 207
See application file for complete search history.

(56) References Cited

U.S. PATENT DOCUMENTS

| | | | |
|---|---|---|---|
| 7,424,551 B2 * | 9/2008 | Odyrna et al. ................. | 709/250 |
| 7,757,279 B2 * | 7/2010 | Furukawa et al. .............. | 726/13 |
| 7,925,746 B1 * | 4/2011 | Melton .......................... | 709/224 |
| 8,099,634 B2 * | 1/2012 | Benhase et al. ................. | 714/44 |
| 2008/0095063 A1 * | 4/2008 | Nakano .......................... | 370/250 |

FOREIGN PATENT DOCUMENTS

| | | |
|---|---|---|
| CN | 1472657 A | 2/2004 |
| CN | 101441506 A | 5/2009 |

OTHER PUBLICATIONS

ZTE Corp, Blade Server System and Power Consumption Management Method Thereof, CN101441506(A) May 27, 2009 Translation.*
Guangda Comp COLTD, Managing System for Blade point Servosystem, CN1472657(A)-Feb. 4, 2004, Translation.*

* cited by examiner

*Primary Examiner* — David Lazaro
*Assistant Examiner* — Marie Georges Henry
(74) *Attorney, Agent, or Firm* — CKC & Partners Co., Ltd.

(57) ABSTRACT

A method for monitoring a plurality of rack systems is provided, which includes the following steps. The rack systems are provided, in which each rack system includes an integrated management module (IMM) and a plurality of servers. The IMM is communicatively connected to the servers in each rack system and manages and controls the servers. The rack systems are distributed into at least one rack group, and one of the IMMs in each rack group is selected to serve as a primary IMM, in which the IMMs in each rack group are communicatively connected to each other. The primary IMM monitors other IMMs than the primary IMM in the corresponding rack group. When an anomaly occurs in one of the other IMMs, the primary IMM sends a warning message including the abnormal IMM.

10 Claims, 3 Drawing Sheets

METHOD FOR MONITORING A PLURALITY
OF RACK SYSTEMS

CROSS-REFERENCE TO RELATED
APPLICATION

This application claims the priority benefit of China application serial no. 201110386021.8, filed on Nov. 28, 2011. The entirety of the above-mentioned patent application is hereby incorporated by reference herein and made a part of this specification.

BACKGROUND OF THE INVENTION

1. Field of the Invention

The present invention generally relates to a technology for centralized management of servers, in particular, to a method for monitoring a plurality of rack systems.

2. Description of Related Art

Many enterprises provide many servers according to cloud services provided by the enterprises or service requirements, and integrate the servers into rack systems that can be managed in a centralized way. The rack systems are also placed in a fixed local area, for example, a container, in a unified way, so as to reduce the management cost of the servers. FIG. 1 is a schematic block diagram of a rack system 100. A network switch 120 and a plurality of servers 110_1-110_n are placed inside the rack system 100. The servers 110_1-110_n each have a network port, and the network ports are all connected to the network switch 120.

The servers 110_1-110_n are connected to an Internet 10 through the network switch 120, and the Internet 10 can also be referred to as a serving network. Each server is an independent computer system. For example, the servers 110_1-110_n each include a power supply, a baseboard management controller (BMC), and a plurality of fans for heat dissipation. In the conventional rack system 100, each of the servers 110_1-110_n manages its own power supply and fans through the BMC, so as to manage and control the power consumption and temperature therein.

Since relevant equipment in the entire rack system 100 needs to be managed, the rack system 100 is further provided with a management module. Since an integrated management module (IMM) is very important to the rack system, a failure message must be gotten in time if the IMM is failed.

SUMMARY OF THE INVENTION

Accordingly, the present invention is directed to a method for monitoring a plurality of rack systems, in which a primary IMM is selected from each group of rack systems to monitor IMMs in the same group and judge whether an anomaly occurs, so as to achieve the function of reporting failures by the IMMs to each other in time when the failures occur without increasing hardware.

The present invention provides a method for monitoring a plurality of rack systems, which includes the following steps. A plurality of rack systems are provided, in which each rack system includes an IMM and a plurality of servers. The IMM is communicatively connected to the servers in each rack system to manage and control the servers. The rack systems are distributed into at least one rack group, and one of the IMMs in each rack group is selected to serve as a primary IMM, in which the IMMs in each rack group are communicatively connected to each other. The primary IMM monitors other IMMs than the primary IMM in the corresponding rack group, so as to judge whether an anomaly occurs in the other IMMs. When an anomaly occurs in one of the other IMMs, the primary IMM sends a warning message including the abnormal IMM.

In an embodiment of the present invention, the monitoring method further includes the following steps. Another of the plurality of IMMs in each rack group is selected to serve as a secondary IMM. The secondary IMM monitors other IMMs than the secondary IMM in the corresponding rack group. When an anomaly occurs in one of the other IMMs, the secondary IMM sends the warning message including the abnormal IMM.

In an embodiment of the present invention, the monitoring method further includes the following step. If the abnormal IMM detected by the secondary IMM is the primary IMM, the secondary IMM is converted into the primary IMM, and one of the other IMMs operating normally in the corresponding rack group is selected to become the new secondary IMM.

In an embodiment of the present invention, the monitoring method further includes the following step. If the abnormal IMM detected by the primary IMM is the secondary IMM, one of the other IMMs operating normally in the corresponding rack group is selected to become the new secondary IMM.

Based on the above, in the embodiments of the present invention, one or two IMMs are selected from each group of rack systems to serve as a leader (a primary IMM) or a deputy leader (a secondary management module) of the group, and the two IMMs together monitor IMMs in the same group and judge whether an anomaly occurs. In addition, the two IMMs, when an anomaly occurs in the opposite party, may also select another IMM operating normally to take over the monitoring work of the abnormal leader or the deputy leader. Since it is unnecessary to arrange redundant IMMs in each rack system, the function of reporting anomalies or failures by the IMMs in time when the anomalies or failures occur is achieved without increasing hardware, thereby facilitating centralized management of the servers.

In order to make the aforementioned features and advantages of the present invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
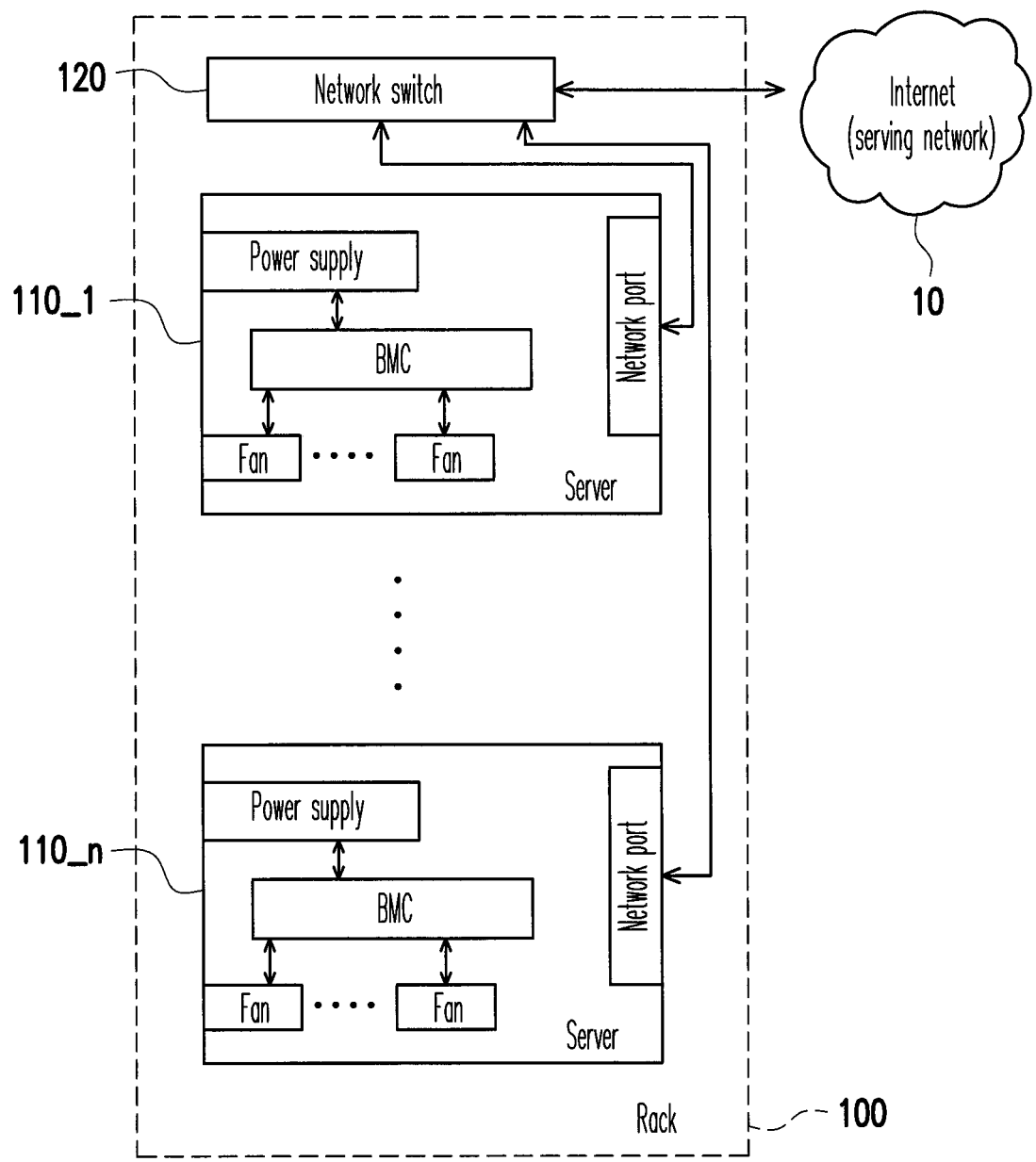
FIG. 1 is a schematic block diagram of a rack system.

Reference will now be made in detail to the present embodiments of the invention, examples of which are illustrated in the accompanying drawings. Wherever possible, the same reference numbers are used in the drawings and the description to refer to the same or like parts.

For a rack system, each rack system conventionally only has a single IMM, or is provided with a plurality of IMMs to back up each other, so as to avoid that servers in the rack system fail to operate due to damage of the IMM. However, the hardware setup cost is increased.

Accordingly, in an embodiment of the present invention, IMMs in a plurality of rack systems are connected to each other, and the rack systems are grouped, so as to select one or two IMMs from each group of rack systems to serve as a leader (a primary IMM) or a deputy leader (a secondary IMM) of the group. In this embodiment, the two IMMs are used together to monitor IMMs in the same group to judge whether an anomaly occurs in the IMMs in the rack group. When the two IMMs find that an anomaly occurs in the opposite party, another IMM operating normally will be selected to take over the monitoring work of the abnormal leader or deputy leader. Therefore, the function of reporting failures by the IMMs to each other in time when the failures occur can be achieved without increasing hardware.

Figure 2:
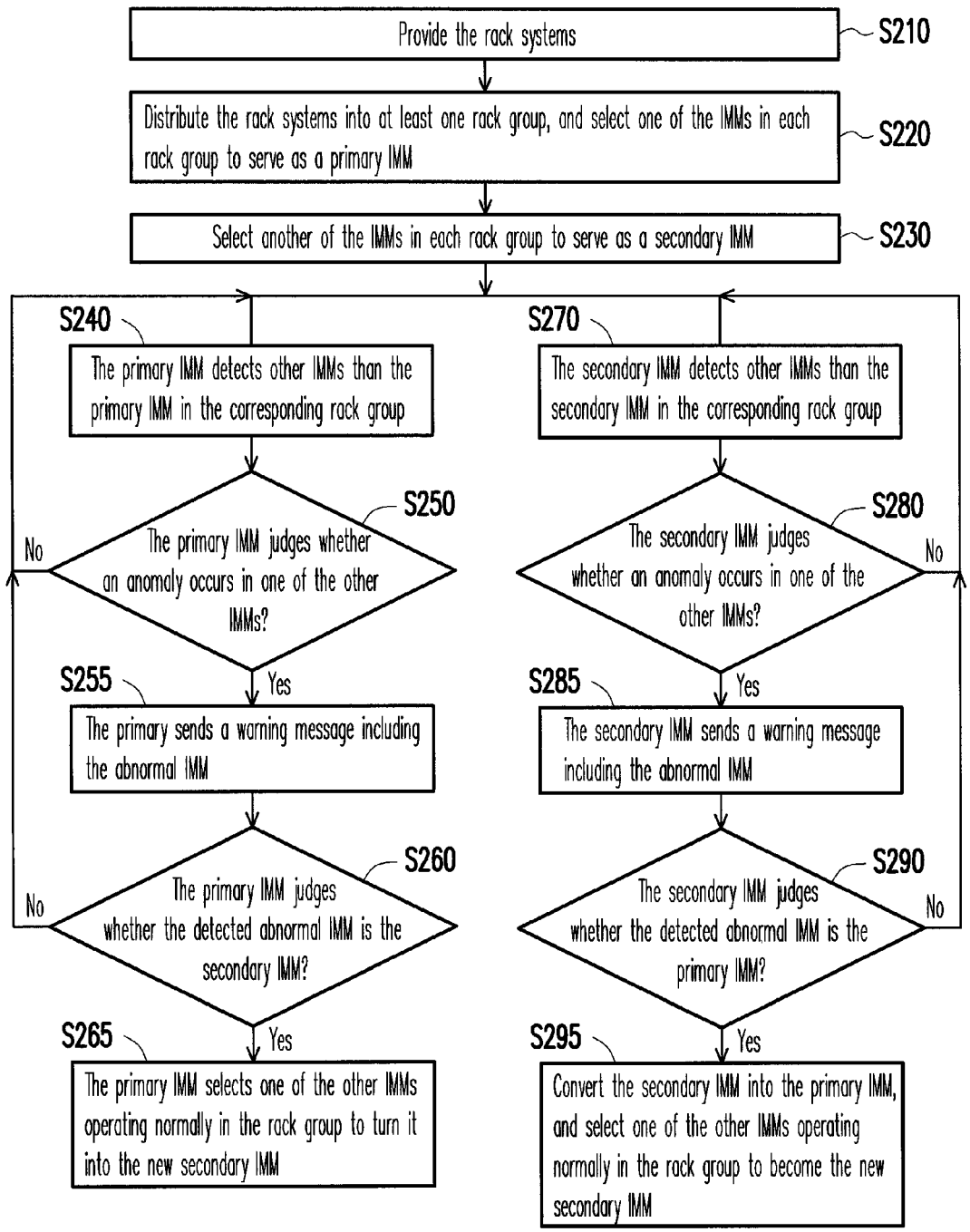
FIG. 2 is a flow chart of a method for monitoring a plurality of rack systems according to an embodiment of the present invention.

FIG. 2 is a flow chart of a method for monitoring a plurality of rack systems 300_1-300_M according to an embodiment of the present invention. The monitoring method described in FIG. 2 is applicable to the plurality of rack systems 300_1-300_M, where M is a positive integer. For ease of description, the rack systems 300_1-300_M may be respectively referred to as a rack 1 to a rack M below in this embodiment. Moreover, M conforming to the embodiment of the present invention may be 2 or a positive integer greater than 2, which is an example only and is not intended to limit the present invention.

First, in Step S210, the plurality of rack systems 300_1-300_M is provided in this embodiment. In this embodiment, the rack systems 300_1-300_M are erected in a container to provide the rack 1 to the rack M. Each rack system respectively includes an IMM and a plurality of servers. In each of the rack systems 300_1-300_M, the IMM is communicatively connected to the servers located in the same rack system 300_1-300_M, so as to manage and control the servers.

In Step S220, the rack systems 300_1-300_M are distributed into at least one rack group, and one of the IMMs in each rack group is selected to serve as a primary IMM. The IMMs 350_1-350_M of the rack systems 300_1-300_M are connected to each other through a management network. In other words, in Step S220, one of the IMMs in each rack group is selected to serve as a leader (or referred to as the primary IMM). In addition, in Step S230, in this embodiment, another of the IMMs in each rack group is further selected to serve as a secondary IMM. In other words, another IMM than the primary IMM in each rack group is selected to serve as a deputy leader (or referred to as the secondary IMM).

Figure 3:
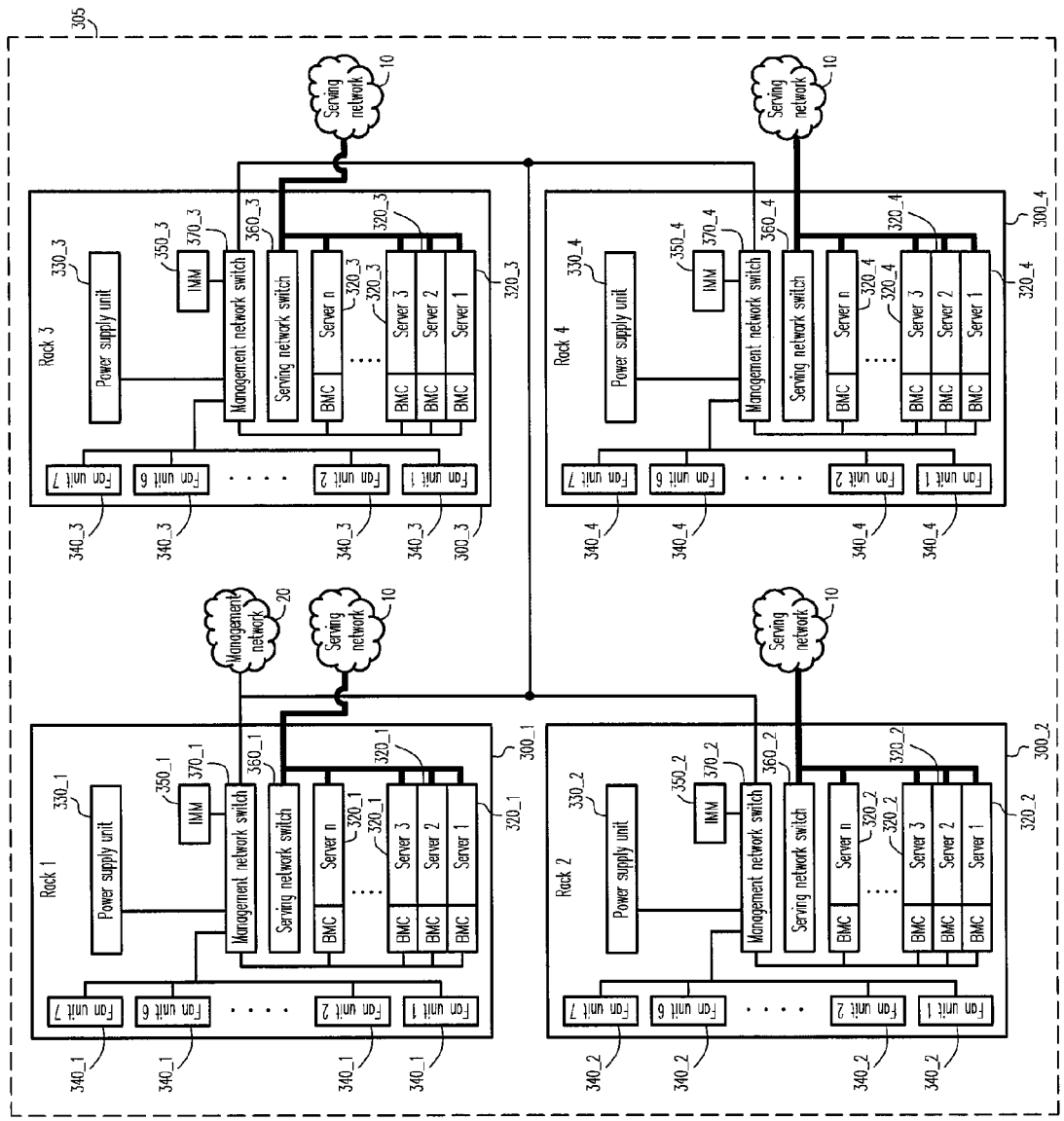
FIG. 3 is a schematic diagram of functional modules of a rack group and rack systems according to an embodiment of the present invention.

In this embodiment, 4 rack systems form a rack group, and a rack group 305 in FIG. 3 is taken as an example. FIG. 3 is a schematic diagram of functional modules of the rack group 305 and the rack systems 300_1-300_4 according to an embodiment of the present invention. However, in other embodiments conforming to the spirit of the present invention, two or more rack systems may also be distributed to serve as a rack group. Therefore, the number of the rack systems in each rack group is not limited to this.

It should be particularly noted that, in Step S220, the distributed structure of the IMMs in the rack systems 300_1-300_M can be used for automatic matching and grouping, so that rack systems corresponding to IMMs in the same network segment are classified as the same group, and the above leader and deputy leader are elected automatically according to relevant feature values of the IMMs. In other words, in this embodiment, rack systems 300_1-300_4 can be automatically distributed into the same rack group 305 through communication between the IMMs.

For example, the IMM of each of the rack systems 300_1-300_M may create a rack information sheet by itself, and write a relevant feature value of the IMM in the rack information sheet. The feature value is, for example, a name (for example, a name preset in a domain name system (DNS)), a serial number, a network protocol address, and/or a media access control address of each of the IMMs or other relevant parameters or information capable of identifying the IMM. In addition, each IMM may also transfer its own feature value to neighboring IMMs using a network packet through the management network 20, so as to improve the rack information sheets of other IMMs.

Then, the IMMs can match corresponding rack systems 300_1-300_M automatically according to their own grouping judgment programs, so that a fixed number of rack systems can be distributed into the same rack group, and the feature values can be used to select the desirable leader and deputy leader automatically. In this embodiment, rack systems corresponding to IMMs in the same network segment are classified as the same rack group.

In other embodiments, the IMMs 350_1-350_4 may also be connected to a remote integrated management center through the management network 20 and a public network switch, and the remote integrated management center can group the rack systems 350_1-350_4 in a unified way, the details of which will not be described herein again.

The hardware architecture and function of each of the rack systems 300_1-300_M are described in detail herein. As shown in FIG. 3, the rack systems 300_1-300_4 respectively include IMMs 350_1-350_4, a plurality of servers 320_1-320_4, power supply units 330_1-330_4, fan units 340_1-340_4, serving network switches 360_1-360_4, and management network switches 370_1-370_4. Since the rack systems 300_1-300_M are similar to each other, the rack system 300_1 (the rack 1) is taken as an example, and the rack 2 to rack M all can be derived from the description of the rack 1 and will not be described herein again.

The servers 320_1 each have a serving network port. A plurality of network connection ports of the serving network switch 360_1 are respectively connected to the serving network ports of the servers 320_1. As a result, the servers 320_1 can provide services to a serving network 10 (for example, the Internet) through the serving network switch 360_1. In addition, the serving network switches 360_1-360_4 also located in the rack group 305 also use respective network connection ports to be connected to the serving networks 10.

The servers 320_1 each have a BMC, and the BMCs each have a management network port. The management network ports of the BMCs are each connected to one of a plurality of network connection ports of the management network switch 370_1. The management network switch 370_1 is coupled to the management network 20. In addition, the management network switches 370_1-370_4 also located in the rack group 305 may use respective network connection ports to be connected to each other or coupled to the public network switch so as to form the management network 20. The management network 20 may be a local area network (LAN), for example, an Ethernet. Therefore, the management network switches 370_1-370_4 may be Ethernet switches or other LAN switches.

In this embodiment, it should be particularly noted that, communication commands between the IMMs, authentication messages of the network switches, intelligent platform management interface (IPMI) messages between the BMCs, messages transmitted to the fan units or the power supply units, configuration information and synchronization information between the IMMs, and so on can be transferred on the management network 20. Therefore, all the information transferred on the management network 20 is used for managing the rack systems.

A management network port of the IMM 350_1 is connected to the management network switch 370_1. In the rack 1, the IMM 350_1 communicates with the BMCs of the servers 320_1 through the management network switch 370_1, so as to obtain operation states of the servers 320_1 (for example, the operation state such as an internal temperature of the servers, and/or control operations of the servers 320_1 (for example, control operations such as start-up and shut-down and firmware update of the servers).

The rack system 300_1 is also provided with a power supply unit 330_1 and a plurality of fan units 340_1. The power supply unit 330_1 provides electric energy to the devices in the rack 1. For example, the power supply unit 330_1 supplies power to the management network switch 370_1, the serving network switch 360_1, the servers 320_1, the fan units 340_1, and the IMM 350_1 in the rack 1. The power supply unit 330_1 and the fan units 340_1 both have a management network port, and the management network ports are connected to the management network switch 370_1. Thereby, the IMM 350_1 can communicate with the power supply unit 330_1 and the fan units 340_1 through the management network switch 370_1, so as to obtain operation states of the power supply unit 330_1 and the fan units 340_1 and/or control operations of the power supply unit 330_1 and the fan units 340_1.

Therefore, based on the above, the equipment inside the rack 1 as described above in this embodiment is the plurality of fan units 340_1, the power supply unit 330_1, and the BMCs of the servers 320_1 in the rack system 300_1 of FIG. 3. The equipment inside the rack 1 is all connected to the first switch (for example, the management network switch). Thereby, the IMM 350_1 of the rack 1 can be connected to the IMM 350_2 of the rack 2 through the first switch (the management network switch) and the second switch (the management network switch) by using an Ethernet protocol.

Referring back to FIG. 2, the method for monitoring a plurality of rack systems in this embodiment is further described with reference to FIG. 3. For ease of description, it is assumed herein that the primary IMM selected in Step S220 is the IMM 350_1 in the rack 1, and the secondary IMM selected in Step S230 is the IMM 350_3 in the rack 3.

Then, Steps S240-S265 are mainly steps in which the primary IMM 350_1 monitors the rack systems 300_2-300_4 in the rack group 305, and Steps S270-S295 are steps in which the secondary IMM 350_3 monitors the rack systems 300_1, 300_3, and 300_4 in the rack group 305, which are described below respectively.

Steps S240-S265 of the primary IMM 350_1 are described first. In Step S240, the primary IMM 350_1 begins to monitor whether an anomaly occurs in other IMMs (for example, the IMMs 350_2-350_4) than the primary IMM 350_1 in the corresponding rack group (for example, the rack group 305 in FIG. 3). The so-called "anomaly" herein may refer to the situation that a network link between the primary IMM 350_1 and the IMMs 350_2-350_4 cannot be connected, one of the management network switches 370_1-370_4 is failed so as to interrupt the connection, one of the IMMs 350_2-350_4 is failed, or the like.

In this embodiment, the management network switches 370_1-370_4 are connected to each other through the management network 20 and more than one network node (for example, the management network switches 370_1-370_4), so as to implement communication between the IMMs 350_1-370_4 and monitoring between them. Therefore, in Step S240, the primary IMM 350_1 (the leader) in the rack group 305 sends a plurality of acknowledgement requests to the other IMMs 350_2-350_4 respectively and periodically, and receives a plurality of acknowledgement responses transferred by the IMMs 350_2-350_4, so as to acknowledge whether the network link from the primary IMM 350_1 to the IMMs 350_2-350_4 is smooth and acknowledge whether an anomaly occurs in the IMMs 350_2-350_4 at the same time.

If the IMM 350_1 does not receive the acknowledgement response returned by the IMMs 350_2-350_4 occasionally, for example, the number of times that the IMM 350_1 does not receive the acknowledgement response continuously is smaller than a threshold, it is possible that the IMMs 350_2-350_4 at that time are already fully loaded, and the network link is too congested so that the acknowledgement response cannot be received for the moment. The situation is allowed to occur occasionally. However, if the number of times that the IMM 350_1 does not receive the acknowledgement response continuously is greater than the threshold, the IMM 350_1 has to judge that an anomaly already occurs in the IMMs 350_2-350_4 not returning the acknowledgement response.

In similar embodiments, the IMM 350_1 may also judge whether an anomaly occurs by monitoring a communication connection status of the IMMs 350_2-350_4. In other words, since each of the IMMs 350_2-350_4 is communicatively connected to the servers 320_2-320_4 periodically, the IMM 350_1 can judge the IMMs 350_2-350_4 or judge whether an anomaly occurs in the network link from the primary IMM 350_1 to the IMMs 350_2-350_4 by monitoring the status of receiving/sending a network packet by the IMMs 350_2-350_4.

When the primary IMM 350_1 judges that an anomaly occurs in one of the other IMMs 350_2-350_4, the process proceeds from Step S250 to Step S255, in which the primary IMM 350_1 sends a warning message including the abnormal IMM. In particular, it is assumed that the abnormal IMM at this time is the IMM 3502, once the primary IMM 350_1 judges that an anomaly occurs in the IMM 350_2, the primary IMM 350_1 begins to detect a communication link between the primary IMM 350_1 and the abnormal IMM 350_2, whether the IMM 350_2 is really failed, and whether relevant equipment in the corresponding rack system 300_2 still can be connected to the management network 20, so as to generate a detection result, and sends a warning message including the abnormal IMM 350_2 and the detection result to a remote integrated management center on the management network 20.

Thereby, management personnel maintaining the rack systems 300_1-300_M can immediately know the occurrence of the anomaly through the remote integrated management center, so as to remove the anomaly right away. The warning message may include an email message, a system log, and/or a Simple Network Management Protocol (SNMP) Trap message, and the embodiment of the present invention does not limit the type of the warning message.

In Step S260, the primary IMM 350_1 judges whether the detected abnormal IMM is the secondary IMM 350_3. If the abnormal IMM detected by the primary IMM 350_1 is really the secondary IMM 350_3, the process proceeds from Step S260 to Step S265, in which the primary IMM 350_1 selects one of the other IMMs operating normally in the rack group 305 to turn it into the new secondary IMM. Thereby, when the secondary IMM 350_3 is abnormal or failed, the primary IMM 350_1 can assign another IMM operating normally to serve as the new deputy leader, so as to continue to perform Steps S270-S295.

Still referring to FIG. 2, Steps S270-S295 are described with the secondary IMM 350_3. Since Steps S240-S255 performed by the primary IMM 350_1 are similar to Steps S270-

S285 performed by the secondary IMM 350_3, some description can be seen in the above text, and will not be given herein again.

In Step S270, the secondary IMM 350_3 monitors other IMMs 350_1, 350_2, and 350_4 than the secondary IMM 350_3 in the corresponding rack group 305. In Step S280, the secondary IMM 350_3 judges whether an anomaly occurs in one of the other IMMs 350_1, 350_2, and 350_4.

It is assumed herein that an anomaly occurs in the IMM 350_2. Therefore, when an anomaly occurs in one of the other IMMs 350_1, 350_2, and 350_4, the process proceeds from Step S280 to Step S285, in which the secondary IMM 350_3 sends a warning message including the abnormal IMM 350_2 to the remote integrated management center, so as to notify the management personnel. The warning message may further include a detection result on a communication link between the secondary IMM 350_3 and the abnormal IMM 350_2 and relevant equipment in the corresponding rack system 300_2.

In Step S290, the secondary IMM 350_3 judges whether the detected abnormal IMM is the primary IMM 350_1. If the abnormal IMM detected by the secondary IMM 350_3 is really the primary IMM 350_1, the process proceeds from Step S290 to Step S295, in which the secondary IMM 350_3 is converted into the primary IMM, and one of the other IMMs operating normally in the rack group 305 is selected to become the new secondary IMM. Thereby, when the original primary IMM 350_1 is abnormal or failed, the secondary IMM 350_3 is converted into the deputy leader, and another IMM operating normally in the rack group 305 is reassigned to become the new deputy leader, so that the new leader and the new deputy leader both can take over Steps S240-S265 and Steps S270-S295 continuously performed by the original leader and deputy leader.

To sum up, in the embodiments of the present invention, one or two IMMs are selected from rack systems of each rack group 305 to serve as a leader (a primary IMM) and a deputy leader (a secondary IMM) of the rack group, and the two IMMs together monitor IMMs in the same group and judge whether an anomaly occurs. Thereby, when the primary IMM is abnormal or disconnected, the secondary IMM still can report the anomaly in time. In other words, when an anomaly or failure occurs in one of the IMMs, the leader or the deputy leader in the same group may report the anomaly or failure to the management personnel of the remote integrated management center in time.

In addition, the two IMMs, when an anomaly occurs in the opposite party, may also select another IMM operating normally to take over the monitoring work of the abnormal leader or deputy leader. In such an architecture, the reliability is similar to the reliability with two redundant IMMs placed in the same rack system, while the hardware cost is the same as the hardware cost without redundant IMMs placed previously. Thereby, since it is unnecessary to arrange redundant IMMs in each rack system, the embodiments of the present invention facilitate centralized management of the servers and can reduce hardware cost.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for monitoring a plurality of rack systems, comprising:
providing the rack systems, wherein each rack system comprises an integrated management module (IMM) and a plurality of servers, and the IMM is communicatively connected to the servers and manages and controls the servers;
distributing the rack systems into at least one rack group, and in each rack group, selecting a primary IMM from the IMMs in the same rack group, wherein the IMMs in the same rack group are communicatively connected to each other;
the primary IMM monitoring other IMMs than the primary IMM in the same rack group; and
when an anomaly occurs in one of the other IMMs in the same rack group, the primary IMM sending a warning message comprising the abnormal IMM, wherein the method further comprises:
selecting another of the IMMs in each rack group to serve as a secondary IMM;
the secondary IMM monitoring other IMMs than the secondary IMM in the corresponding rack group;
when an anomaly occurs in one of the other IMMs, the secondary IMM sending the warning message comprising the abnormal IMM; and
if the abnormal IMM detected by the secondary IMM is the primary IMM, converting the secondary IMM into the primary IMM, and selecting one of the other IMMs operating normally in the rack group to become the new secondary IMM.

2. The monitoring method according to claim 1, further comprising:
if the abnormal IMM detected by the primary IMM is the secondary IMM, selecting one of the other IMMs operating normally in the rack group to become the new secondary IMM.

3. The monitoring method according to claim 1, further comprising:
when an anomaly occurs in one of the other IMMs, the secondary IMM detecting the abnormal IMM and one of the rack systems corresponding to the abnormal IMM to generate a detection result, and sending the warning message comprising the abnormal IMM and the detection result.

4. The monitoring method according to claim 3, wherein the secondary IMM detects a communication link between the secondary IMM and the abnormal IMM to generate the detection result.

5. The monitoring method according to claim 1, wherein the step of distributing the rack systems into the at least one rack group comprises:
matching the corresponding IMMs automatically according to at least one feature value of the IMMs, so that the rack systems corresponding to the IMMs in the same network segment are classified as the same group.

6. The monitoring method according to claim 5, wherein the at least one feature value is a name, a network protocol address, and/or a media access control address of each of the IMMs.

7. The monitoring method according to claim 1, further comprising:
when an anomaly occurs in one of the other IMMs, the primary IMM detecting the abnormal IMM and the rack systems corresponding to the abnormal IMM to generate a detection result, and sending the warning message comprising the abnormal IMM and the detection result.

8. The monitoring method according to claim 7, wherein the primary IMM detects a communication link between the primary IMM and the abnormal IMM to generate the detection result.

9. The monitoring method according to claim 1, wherein the step of the primary IMM monitoring the other IMMs comprises:

the primary IMM sending a plurality of acknowledgement requests to the other IMMs respectively and periodically, and receiving a plurality of acknowledgement responses transferred by the other IMMs respectively; and when the number of times that the primary IMM does not receive a specific acknowledgement response is greater than a threshold, the primary IMM judging one of the other IMMS corresponding to the specific acknowledgement response as abnormal.

10. The monitoring method according to claim 1, wherein the step of the primary IMM monitoring the other IMMs comprises:

the primary IMM monitoring a network connection status of the other IMMs to judge whether an anomaly occurs in the other IMMs.

* * * * *